(12) United States Patent
Rischen et al.

(10) Patent No.: US 8,262,138 B2
(45) Date of Patent: Sep. 11, 2012

(54) TRANSMISSION ELEMENT FOR WORKPIECE CONNECTIONS TO BE AXIALLY COMPRESSED AND CONFIGURATION FOR PRODUCING A NONDETACHABLE CONNECTION

(75) Inventors: Christian Rischen, Eslohe (DE); Sudi Sinoplu, Attendorn (DE)

(73) Assignee: Viega GmbH & Co. KG, Attendorn (DE)

( * ) Notice: Subject to any disclaimer, the term of this patent is extended or adjusted under 35 U.S.C. 154(b) by 251 days.

(21) Appl. No.: 12/388,177

(22) Filed: Feb. 18, 2009

(65) Prior Publication Data
US 2009/0231066 A1    Sep. 17, 2009

(30) Foreign Application Priority Data
Feb. 19, 2008   (DE) .......................... 10 2008 010 084

(51) Int. Cl.
*F16L 47/00* (2006.01)
(52) U.S. Cl. .................. 285/255; 285/243; 285/323
(58) Field of Classification Search .............. 285/242, 285/243, 255, 256, 323
See application file for complete search history.

(56) References Cited

U.S. PATENT DOCUMENTS

| | | | | |
|---|---|---|---|---|
| 409,066 | A | * | 8/1889 | Ravenel .......................... 285/243 |
| 2,310,536 | A | * | 2/1943 | Melsom et al. |
| 2,704,074 | A | * | 3/1955 | Butler ........................... 285/256 |
| 2,926,029 | A | * | 2/1960 | St Clair et al. ................. 285/256 |
| 2,978,263 | A | * | 4/1961 | Walsh et al. ................... 285/256 |
| 3,191,975 | A | * | 6/1965 | La Marre et al. .............. 285/243 |
| 3,345,091 | A | * | 10/1967 | Nicol ............................. 285/256 |
| 3,738,688 | A | * | 6/1973 | Racine |
| 3,868,130 | A | * | 2/1975 | Schwertner et al. .......... 285/243 |
| 4,162,092 | A | * | 7/1979 | Hayes |
| 4,212,487 | A | | 7/1980 | Jones et al. |
| 4,305,608 | A | * | 12/1981 | Stuemky et al. .............. 285/256 |
| 4,412,693 | A | * | 11/1983 | Campanini ...................... 285/39 |
| 4,552,387 | A | * | 11/1985 | Schmidt ........................ 285/243 |
| 4,564,222 | A | * | 1/1986 | Loker et al. ................... 285/243 |
| 4,598,938 | A | | 7/1986 | Boss et al. .................. 285/382.2 |
| 4,932,689 | A | * | 6/1990 | Bradley ........................ 285/255 |
| 6,626,469 | B2 | * | 9/2003 | Favre et al. |
| 6,773,039 | B2 | * | 8/2004 | Muenster et al. ............. 285/259 |
| 6,874,823 | B2 | * | 4/2005 | Viegener ....................... 285/256 |
| 2003/0193190 | A1 | * | 10/2003 | Werth ........................... 285/243 |
| 2004/0169370 | A1 | | 9/2004 | Chelchowski et al. |
| 2004/0195831 | A1 | * | 10/2004 | Ohya ............................ 285/242 |

FOREIGN PATENT DOCUMENTS

| | | |
|---|---|---|
| EP | 0 159 997 B1 | 11/1985 |
| EP | 1 288 554 A1 | 3/2003 |
| WO | 00/34706 | 6/2000 |
| WO | 03/004927 A1 | 1/2003 |

OTHER PUBLICATIONS

Definition of "pipe", "Webster's Seventh New Colegiate Dictionary", 1969, G&C Merriam Co., p. 643.*

* cited by examiner

*Primary Examiner* — James Hewitt
*Assistant Examiner* — Jay R Ripley
(74) *Attorney, Agent, or Firm* — Proskauer Rose LLP

(57) ABSTRACT

A transmission element, which has a permanent nondetachable connection, is producible employing an axial pressing technique using simple means. The transmission element for workpiece connections to be axially compressed includes a flange section and a transmission section. The transmission section exhibits a substantially cylindrical internal peripheral surface, and the wall thickness of the transmission section tapers from the end proximal to the flange section to the end distal to the flange section. The transmission element is manufactured from a heat-resistant plastic.

17 Claims, 8 Drawing Sheets

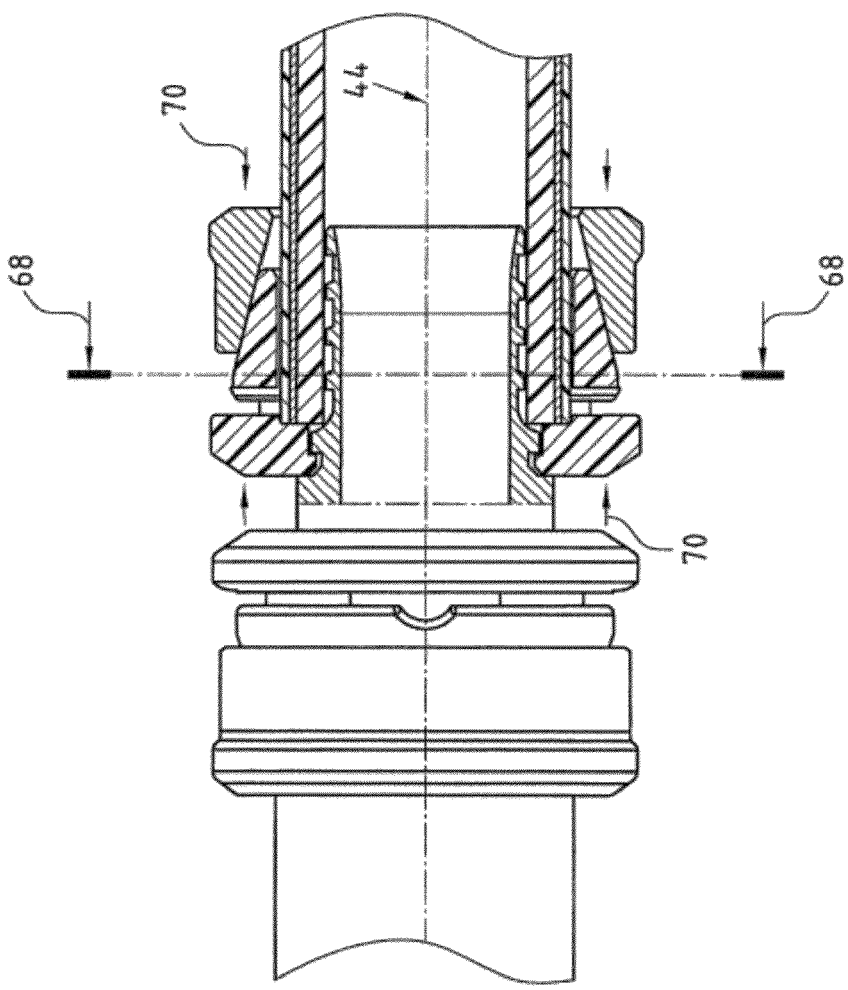
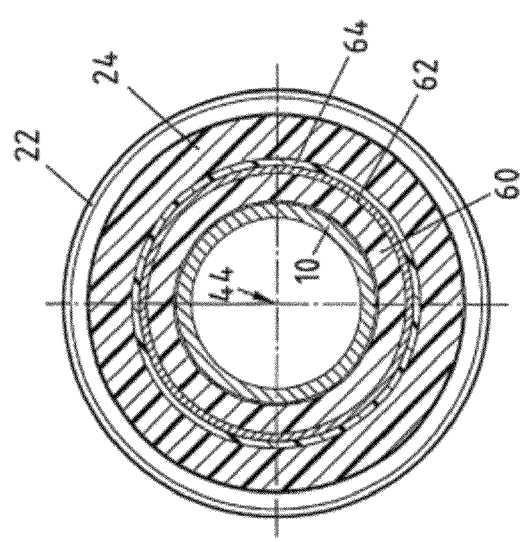
Fig. 1f
Fig. 1e

TRANSMISSION ELEMENT FOR WORKPIECE CONNECTIONS TO BE AXIALLY COMPRESSED AND CONFIGURATION FOR PRODUCING A NONDETACHABLE CONNECTION

CROSS-REFERENCE TO RELATED APPLICATIONS

This application which claims the benefit of and priority to German patent application no. DE 10 2008 010 084.6-24, filed on Feb. 19, 2008. The disclosure of the above application is incorporated herein by reference in its entirety.

FIELD OF THE INVENTION

The invention relates to a transmission element for workpiece connections to be axially compressed. Furthermore, the invention relates to a configuration for producing a nondetachable connection.

BACKGROUND

Transmission elements and/or configurations are known from the prior art. A nondetachable connection, in particular between a pipe and a fitting, is produced employing an axial pressing technique, for example according to a method described hereafter. A profiled transmission element, particularly provided with a specific number of bead-like external projections, is put onto a pipe end. The pipe end encompassed by the transmission element is pushed onto an optionally profiled support body of a fitting having a shoulder, so that the front faces of the pipe and of the transmission element abut against the shoulder. Subsequently, a union press sleeve being optionally profiled, which exhibits internal beads, for example, is pushed over the pipe end encompassed by the transmission element in the direction of the shoulder of the fitting. The transmission element and the pipe end on the support body are reshaped radially inward by the interaction with the union press sleeve, so that a non-positive, and possibly also a formfitting connection is provided. However, this procedure has the disadvantage that only punctual reshaping forces are caused by the bead-like projections, by which the pressing result, in particular a form-fit of the pipe with the support body of the fitting which is necessary for the tightness of the nondetachable connection, may be impaired. To remedy this impairment, a separate seal element, such as an O-ring, may be situated between the support body and the pipe end. However, the effort necessary to produce the nondetachable connection and also the necessary care to be applied when producing the nondetachable connection are thus increased.

Furthermore, the contact of the front faces of the pipe and of the transmission element with the shoulder of the fitting, as described above, restricts the selection of the materials from which the pipe and/or the fitting may be manufactured. For example, if the pipe is a metal pipe or a composite pipe having a metal layer and the fitting is manufactured in this example from a metal or from a material of another type which has a chemical potential deviating from the metal of the pipe, the structure of the pipe may be damaged, in the case of a composite pipe possibly even invisibly to the eye of an observer, in particular by contact corrosion after the compression procedure.

SUMMARY OF THE INVENTION

The present invention is therefore based on the technical problem of specifying a transmission element and a configuration, using which a permanent nondetachable connection is producible employing an axial pressing technique using simple means.

The technical problem is solved by a transmission element for workpiece connections to be axially compressed, with a flange section and with a transmission section, the transmission section exhibits a substantially cylindrical internal peripheral surface and the wall thickness of the transmission section tapering from the end proximal to the flange section up to the end distal to the flange section.

The internal peripheral surface of the transmission section is implemented as substantially cylindrical. This is to be understood to mean that a pipe provided for a nondetachable connection is insertable on the transmission section side into the transmission element, possibly friction-locked. Because many pipes have a circular external cross-section, an appropriately adapted circular-cylindrical design of the internal peripheral surface of the transmission section may therefore be expedient. However, the transmission element may also be designed suitably for other pipe external cross-sections, such as ellipsoidal or prismatic cross-sections, for example. The term cylindrical is thus to be understood very broadly. In particular, the substantially cylindrical internal peripheral surface may be modified by structural features which only insignificantly change the cylindrical character of the surface, for example, because of their small dimensions.

An external peripheral surface is advantageously provided by the tapering of the wall thickness of the transmission section which allows a more uniform force exertion in the interaction with a suitable sliding sleeve actuated for the purpose of the pressing during the pressing procedure. In this way, irregularities in the pressing result between the support body of a fitting and a pipe, which impair the tightness of a nondetachable connection, may be avoided. Measures in the form of additional seal elements are thus also avoidable. In addition, an at least partial force direction change from the axial direction into the radial inward direction is made possible by the external peripheral surface of the transmission section, which is inclined to the central axis of the transmission element. The transmission element according to the invention is thus particularly usable for axial pressing techniques.

The flange section advantageously offers a contact surface for the front face of a pipe which is to be inserted into the transmission element and pressed in therewith. In particular, material incompatibilities, for example in the form of contact corrosion, may thus be avoided by a suitable selection of the materials of the flange section as of the pipe or of the composite pipe, respectively.

The flange section and the transmission section may be implemented in one piece. The flange section and the transmission section are preferably connected via a bridge section, which is in particular formed by means of a recess. In this way, an extensive decoupling of the flange section and of the transmission section may be ensured, in particular during the pressing procedure. The wall thickness of the transmission element is decreased between the flange section and the transmission section, i.e., on the bridge section, by the recess, so that the forces transmitted from a sliding sleeve onto the transmission section during the pressing procedure are only transmitted also onto the flange section in a strength which essentially does not reshape the flange section. The flange section therefore substantially maintains its shape after the pressing procedure, whereas the transmission section is reshaped radially inward, and possibly also with compression of the bridge section also in the axial direction toward the flange section.

Alternatively, however, it is also possible to implement the flange section and the transmission section in two pieces. In this way, a higher flexibility may be achieved upon the configuration of the workpieces to produce a nondetachable connection, but also during the production of the workpieces. In particular, the flange section and the transmission section are connectable using connection elements, in particular plug connection elements. These connection elements may be pins, projections, and/or corresponding fitted grooves, for example, which allow the flange section to be plugged onto the transmission section, in particular friction-locked, or vice versa.

In a further advantageous embodiment of the transmission section, the flange section has a catch projection extending radially inward. Using the catch projection situated on the flange section, the transmission element may be at least nonpositively connected to a fitting. In this way, the construction design of a fitting required for the production of a nondetachable connection may be simplified. This is because the fitting itself no longer has to have a shoulder which defines the pressing position of a pipe in the axial direction. Rather, it is sufficient if the fitting has a catch element, such as a catch groove for example, corresponding to the catch projection situated on the flange section of the transmission element.

The internal peripheral surface of the flange section, in particular its shape or its diameter, respectively, may also additionally or alternatively be designed in a way suitable for a press fit with the main body of a fitting, however. A friction-locked fit of the transmission element on a fitting may thus be achieved, which is possibly capable of retaining the transmission element and the fitting in an extensively fixed position to one another even in the event of forces exerted during the compression procedure.

At least one web running in the axial direction may be provided on the internal peripheral surface of the transmission section. The internal cross-section of the transmission section may be locally constricted along the extension of the web by a web extending radially inward from the internal peripheral surface of the transmission section and additional fixing against rotational movements of a pipe inserted on the transmission section side into the transmission element may thus be achieved. If at least two webs are provided, the pipe inserted into the transmission element may additionally be centered more reliably in relation to the central axis of the transmission element. In this way, manufacturing tolerances of the external diameter of an inserted pipe may be accounted for. If the external diameter of a pipe has a slight undersize, deviating from the standard external diameter, an undesired rotational movement of the pipe relative to the transmission element may otherwise be triggered during the handling of the pipe inserted into the transmission element, which obstructs the pressing procedure or makes it more difficult, respectively.

The internal peripheral surface of the transmission section may be implemented in the form of a polygon. An undesired rotational movement of an inserted pipe may also be inhibited by this structural refinement of the transmission element according to the invention.

The external peripheral surface of the transmission section is preferably implemented in the form of a conical segment. In this way, in particular the production of the transmission section and possibly the production of workpieces, such as sliding sleeves, having interaction surfaces adapted to these transmission sections, which are provided jointly for the production of a nondetachable connection performed using axial pressing technique, are simplified. A high degree of compatibility between the sliding sleeves and the transmission elements may thus be achieved.

In particular, the angle of inclination of the external peripheral surface of the transmission section in relation to the central axis may be between 5° and 15°, in particular 10°. Through this design, the stability of the configuration during the pressing procedure may be promoted in particular. This is because a sliding sleeve having an appropriately adapted internal contour may thus be guided cautiously but with continuously increasing exertion of force on the transmission section, which benefits the quality of the pressing result.

Preferably, at least one opening is provided on the end of the transmission section proximal to the flange section and/or on the bridge section. The opening allows a user to check the recommended, possibly prescribed engagement of the pipe end into the transmission element. Depending on the extent of the reshaping caused by the pressing procedure, the check may be executable both before and also after the pressing procedure. If the opening has a longitudinal extension around the circumference, it may additionally promote the decoupling of the flange section and the transmission section. This is because no forces transmitted onto the transmission section are relayed to the flange section at the opening between flange section and transmission section. The strain of the flange section during the pressing procedure may thus be additionally decreased.

In a further advantageous embodiment of the transmission element, the external peripheral surface of the flange section may have a chamfer on the front face. In this way, an interaction surface for compression tools, which are actuated using a radial inward movement, may particularly be provided. For example, if a section of a compression jaw, which has a corresponding angle of inclination in relation to the central axis of the transmission element, is in contact with the chamfer, the dynamics caused by the radial inward movement may be at least partially changed in direction into a compression force acting in the axial direction. Tools which were actually conceived for the compression in the radial inward direction may thus be used for the pressing in the axial direction. In this way, advantages intrinsic to tools of this type may be exploited, such as small spatial dimensions and/or low weight.

Furthermore, the external peripheral surface of the transmission section and/or the chamfer of the flange section are preferably implemented to support sliding ability. In this way, the pressing procedure may be eased. The external peripheral surface and/or the chamfer may be implemented to support the sliding ability in various ways. It is possible to implement the corresponding sections of the flange section or transmission section in two parts, and to manufacture the surfaces from a material such as polytetrafluoroethylene or a similar material. However, it is also possible to increase the sliding capability using a lubricating coating of the surfaces, for example, using an anti-friction lacquer coating.

A recess which undercuts the catch projection may be provided on the front face of the flange section, in particular an annular recess. The pliability of the catch projection is promoted in particular by the undercut, so that the catch projection may more easily overcome the walls of a catch groove on the main body of a fitting corresponding thereto and engage like a snap closure. In addition, material of the transmission element is removed by the incorporation of the undercut, by which the weight of the transmission element is reduced.

In a further advantageous embodiment of the transmission element, the catch projection is beveled on the side facing toward the front face of the flange section. In this way, the production of an engagement of the catch projection in a catch groove situated on a fitting, in particular using a movement in the axial direction, may be made easier.

Furthermore, the internal peripheral surface of the catch projection may be implemented in the form of a polygon. In this way, undesired rotational movements of the flange section or, respectively, the transmission element in relation to the fitting may be avoided if the catch projection and the catch groove are engaged. Additionally or alternatively, of course, rotary protection webs, or possibly also rotary protection beads may be provided on the internal peripheral surface of the catch projection. The liability to rotational movements may thus also be decreased.

The transmission element is preferably manufactured from a heat-resistant plastic which is dimensionally stable up to a temperature of 95° C., in particular 85° C. Plastics from the group of polysulfones or polyphenylsulfones, from the group of thermally stabilized plastics, in particular fiber-reinforced polyamides or polyvinylidene fluoride come into consideration in particular. Due to the use of materials of this type, the transmission elements fulfill the requirements placed on nondetachable connections in the field of drinking water or heating installations. The above-mentioned materials have advantageous reshaping properties and a low tendency toward contact corrosion. Transmission elements made of these materials are therefore particularly suitable for use with pipes made of a metal material or for use with a layer of composite pipes comprising a metal material.

According to a further teaching of the present invention, the technical problem is also solved by a configuration for producing a nondetachable connection with a fitting, the fitting exhibiting a support body, which has a profile, and a main body, with a transmission element, the transmission element exhibiting a flange section and a transmission section, which has an essentially cylindrical internal peripheral surface, the wall thickness of the transmission section tapering from end proximal to the flange section up to the end distal to the flange section, and with a sliding sleeve, the contour of the internal peripheral surface of the sliding sleeve being adapted to the contour of the external peripheral surface of the transmission section, the transmission element encompassing the support body and at least partially the main body, the sliding sleeve being partially pushed onto the transmission section, and the internal peripheral surface of the sliding sleeve and the external peripheral surface of the transmission section being at least partially in friction-locked contact.

The transmission element and the fitting may, for example, be in friction-locked contact using a press fit.

However, it is also possible to provide the flange section with a catch projection extending radially inward and the main body of the fitting with a catch groove. In this case, the fitting allows locking of the transmission element with the fitting in the axial direction by an engagement of the catch projection situated on the flange section of the transmission element in the catch groove situated on the fitting main body. In this way, the fitting and the transmission element may be retained in a defined position before the pressing procedure. In addition, it is no longer necessary to provide the fitting with a shoulder used as a contact for the front faces of the other workpieces to be pressed in. The requirements for the manufacturing of the fitting are thus simplified in particular.

It is possible that, in addition to the support body provided for a pipe connection, the fitting may also have connection sections of other, fundamentally arbitrary types. The fitting may thus also comprise a valve, a cock, or a similar armature and/or multiple similar armatures, for example. In the simplest exemplary case, however, the fitting only has two pipe connections which comprise a support body.

The support body preferably has a profile on its external peripheral surface which offers the material of a pipe to be pressed in, which is reshaped and possibly displaced in the course of the pressing procedure, a volume into which it may flow. The profile of the support body may have multiple annular peripheral grooves delimited by annular peripheral partition webs, for example.

The contour of the internal peripheral surface of the sliding sleeve is preferably adapted to the contour of the external peripheral surface of the transmission section. If the external peripheral surface of the transmission section is implemented in the form of a conical segment, for example, the internal peripheral surface of the sliding sleeve has a conical segment shape correspondingly adapted thereto. In this way, a uniform force transmission may be achieved from the sliding sleeve onto the transmission element, which promotes the stability of the configuration of the workpieces during the compression procedure.

In particular, a system made of workpieces which is commercially obtainable by a user may be provided by the configuration according to the invention. The user thus only has to ensure that the shape of the external cross-section and/or the external diameter of the pipes to be pressed in by him are matched with the particular dimensions of the fitting, for example, of the support body or, respectively, the transmission element, such as the transmission section.

The wall of the sliding sleeve is preferably implemented as essentially wedge-shaped in cross-section. Pushing the sliding sleeve onto the transmission section of the transmission element is thus simplified in particular.

Furthermore, the sliding sleeve may have a chamfer, which is particularly implemented to support sliding, on its wide end. In this way, an interaction surface for pressing tools, which are actuated using a radial inward movement, may be provided in particular. Tools which were actually conceived for the compression in the radial inward direction may thus be used for the compression in the axial direction. In this way, advantages intrinsic to tools of this type such as small spatial dimensions and/or low weight may be exploited. The compression procedure may be made easier by the lubricating implementation of the chamfer.

BRIEF DESCRIPTION OF THE DRAWINGS

The invention is explained in greater detail hereafter on the basis of exemplary embodiments shown in a drawing. In the drawing

DETAILED DESCRIPTION

An axial compression method, in which an exemplary embodiment of the transmission element 2 according to the invention is employed, is explained as an example hereafter with reference to FIGS. 1a-f.

Figure 1A:
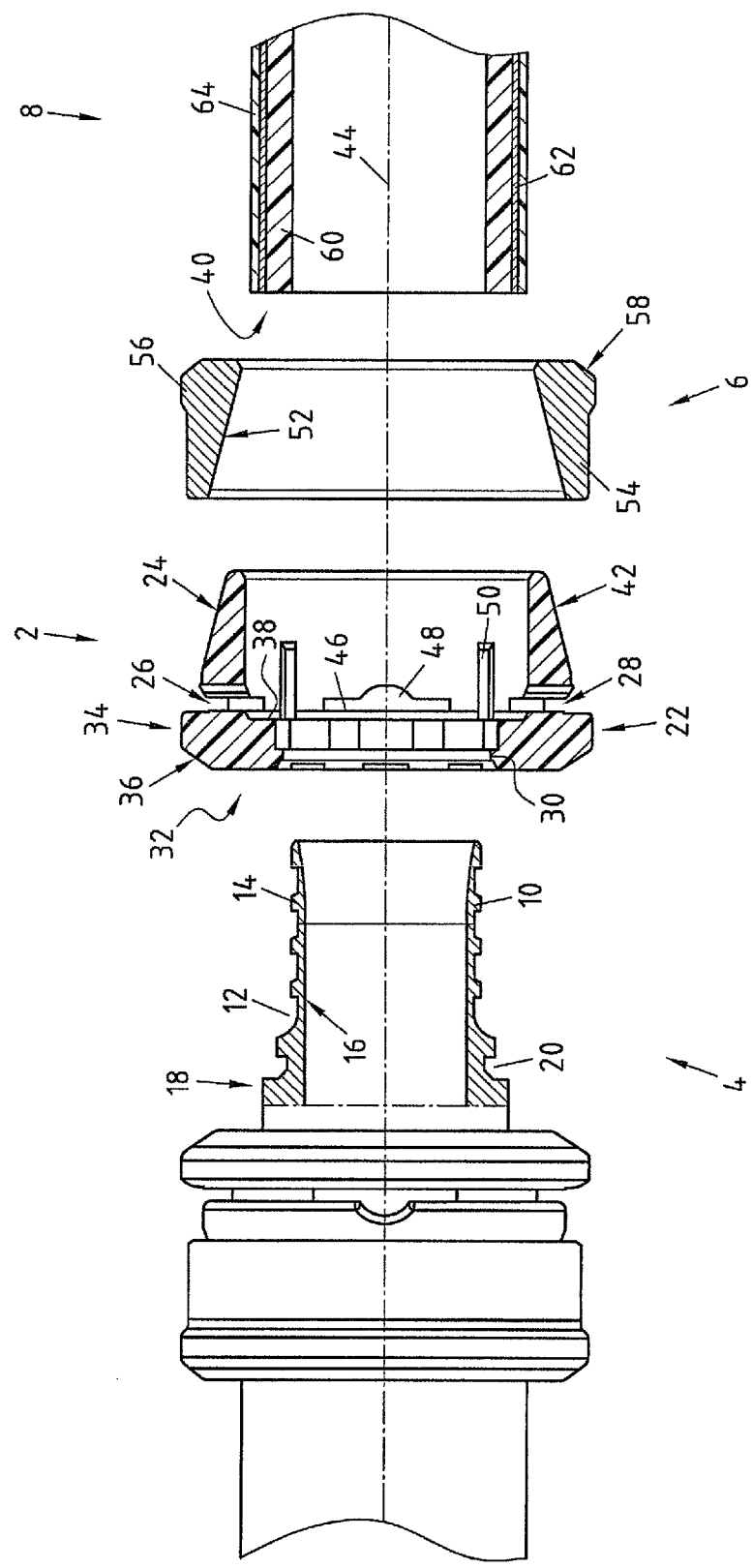
FIGS. 1a-f show a cross-sectional view of an exemplary method for producing a nondetachable connection employing an exemplary configuration made of a fitting, an exemplary embodiment of the transmission element according to the invention, a sliding sleeve, and a pipe.

FIG. 1a shows four workpieces in a cross-sectional view: a fitting 4, a transmission element 2, a sliding sleeve 6, and a pipe 8.

The fitting 4 has a support body 10 having a profile. In this special example, the profile comprises four annular peripheral grooves 12, which are delimited from one another by three annular peripheral partition webs 14 situated between them. The internal peripheral surface 16 of the support body 10 is implemented as substantially cylindrical, the support body walls being slightly beveled radially outward on the distal end of the support body 10, however, to make the cross-sectional transition continuous. The support body 10 extends in this example from a main body 18 which has an annular peripheral catch groove 20 on the external peripheral surface.

A transmission element 2 according to the present invention is situated in front of the fitting 4 in FIG. 1a. In this special example, the transmission element 2 has a flange section 22 facing toward the fitting 4, a transmission section 24, and a bridge section 28 formed between the flange section 22 and the transmission section 24 using a recess 26. In this exemplary embodiment, the flange section 22 has a catch projection 30 extending radially inward on the internal peripheral surface, which is slightly beveled on the side facing toward the front phase 32 of the flange section 22. The catch projection 30 is particularly implemented in such a way that it may engage in the catch groove 20 situated on the fitting 4, which is shown as an example here, and may cause an axial lock. In the exemplary embodiment of the transmission element 2 shown in FIG. 1a, in addition, a chamfer 36 is situated on the external peripheral surface 34 of the flange section 22 on the front face, which may be used as an interaction surface with a compression tool (not shown). Furthermore, the flange section 22 has a contact recess 38 open toward the transmission section 24 on its area extending radially inward, on which the front face 40 of a pipe 8 may come into contact. The internal peripheral surface of the flange section 22 is implemented as a polygon in this example. In this way, additional security against undesired rotational movements of the transmission element 2 relative to the fitting 4 may be achieved in the interaction with the external peripheral surface of the fitting main body 18 opposite to the internal peripheral surface of the flange section 22.

The transmission section 24 of the transmission element 2 has a wall thickness which tapers from the end proximal to the flange section 22 up to the end distal to the flange section 22. In this special exemplary embodiment, the external peripheral surface 42 of the transmission section 24 is implemented as a conical segment surface, which is inclined at an angle of approximately 10° in relation to the central axis 44 of the transmission element 2. However, it is also possible to select an angle of 5° to 15° or even beyond this interval, if it is expedient. In the cross-sectional view, the wall of the transmission section 24 thus essentially has a wedge shape.

A bridge section 28 is formed between the flange section 22 and the transmission section 24 using a recess 26 engaging radially inward in the exemplary embodiment shown in FIG. 1a, so that the flange section 22 and the transmission section 24 are connected to one another in one piece. However, it is also possible to implement the flange section 22 and the transmission section 24 in two pieces. In particular, the flange section 22 and the transmission section 24 may be workpieces separable from one another, which are connectable to one another using suitable connection elements (not shown), such as plug connection elements like pins, springs, and/or fitted grooves, in particular friction-locked. The bridge section 28 has four openings 46 in this example, which have an extension running substantially in the peripheral direction and, in addition, a bulge 48 extending into the transmission section 24. The openings 46 allow a user to visually check the position of the workpieces before and possibly after the pressing procedure. The openings 46 may, of course, also have a different shape or, respectively, be situated at a different location, for example exclusively on the transmission section 24. The number of the openings 46 may fundamentally also be selected freely.

Furthermore, four webs 50 running in the axial direction are provided on the internal peripheral surface of the bridge section 28 and the transmission section 24, which slightly locally constrict the internal cross-section of the transmission element 2 on the transmission section 24, and in this example also on the bridge section 28, and thus ensure security against undesired rotational movements of a pipe 8 inserted into the transmission element 2 relative to the transmission element 2. The webs 50 extend according to FIG. 1a from the transmission section 24 up to the bridge section 28. Of course, it is also possible to provide the webs 50 only on the transmission section 24 to obtain the desired rotation-inhibiting effect. The number of the webs 50 may fundamentally be selected freely. Additionally or alternatively to the webs 50, an implementation of the internal peripheral surface of the transmission section 24 and/or bridge section 28 as a polygon (not shown) may be provided as a rotational lock.

The transmission element 2 may be produced from a polysulfone, polyphenylsulfone, or thermally-stabilized, in particular fiber-reinforced polyamide. Of course, other materials are also conceivable, such as polyvinylidene fluoride.

Furthermore, FIG. 1a shows a sliding sleeve 6 having an internal peripheral surface 52, which is implemented as an interaction surface with the external peripheral surface 42 of the transmission section 24 and therefore has the shape of a hollow conical segment in this special example. The angle of inclination of the conical segment surface relative to the central axis 44 is adapted accordingly to the angle of inclination of the external peripheral surface 42 of the transmission section 24. In the cross-sectional view, the wall 54 of the sliding sleeve 6 substantially has a wedge shape. This wedge shape is only modified by a flange-like projection 56 on the wide end of the wedge, in other words on the side of the sliding sleeve 6 facing away from the transmission element 2. In addition, the sliding sleeve 6 has a chamfer 58, on which a pressing tool (not shown) may engage, on the wide end, i.e. on the end at which the wall 54 has the greatest thickness.

The last workpiece in the configuration shown in FIG. 1a is a composite pipe 8 in this exemplary embodiment, which comprises three layers 60, 62, 64. For example, the inner layer 60 may consist of a cross-linked polyethylene (PEX), the middle layer 62 may consist of a metal such as aluminum, and the outer layer 64 may consist of a plastic which is particularly resistant to mechanical strains or also adequate from aesthetic aspects. However, the composite pipe 8 is only to be understood as an example. Of course, the configuration shown in FIG. 1a may also comprise a single-layer pipe, for example made of a plastic or a metal or, respectively, a metal material. The cross-section of the pipe 8 is fundamentally also not restricted. It is decisive that the relevant diameter of the workpieces, i.e., the external diameter of the support body 10 of the fitting 4 and the internal diameter of the pipe 8 or, respectively, the external diameter of the pipe 8 and the internal diameter of the transmission section 24 of the transmission element 2 are suitable for one another or adapted to one another, respectively.

Figure 1B:
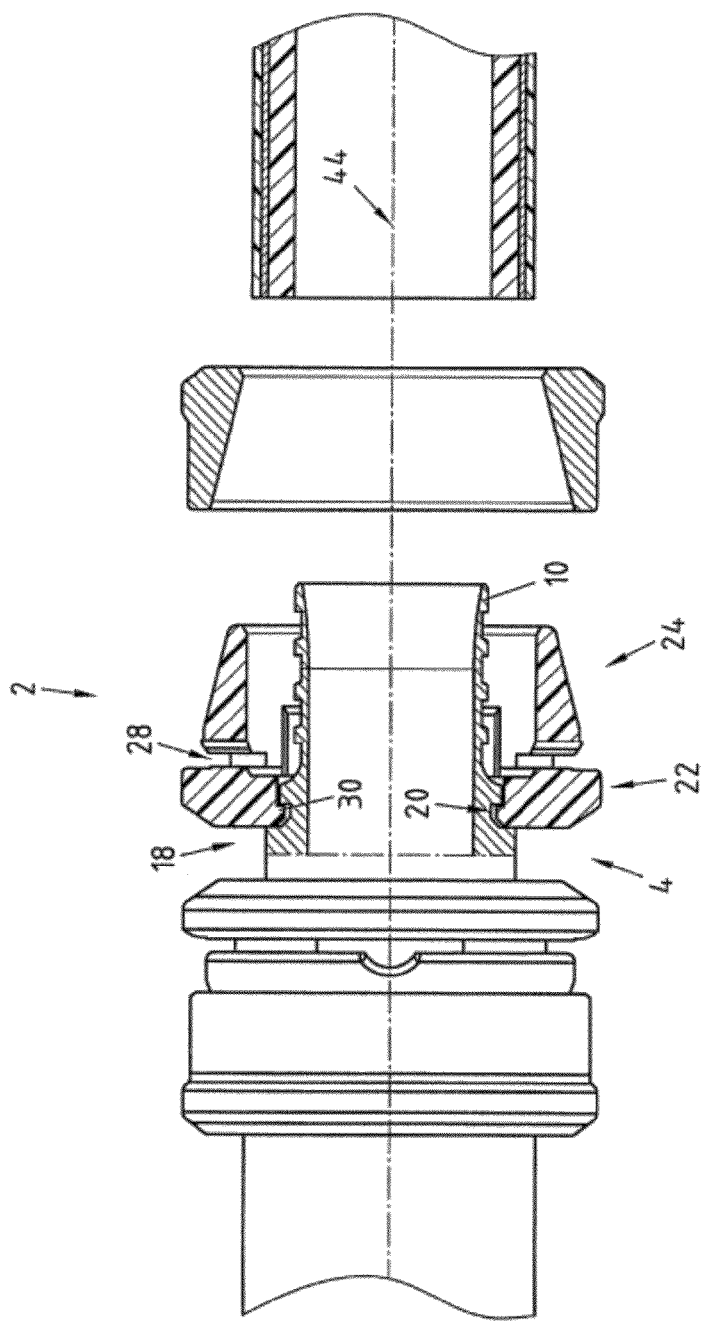

The configuration shown in FIG. 1b differs from that shown in FIG. 1a in that the transmission element 2 has been put onto the fitting 4 or, respectively, that the fitting 4 engages in the transmission element 2. The catch projection 30 situated on the flange section 22 is engaged with the catch groove 20 situated on the fitting main body 18 and thus prevents an axial movement. Axial movements may additionally or alternatively also be avoided by a press fit of the two workpieces. In the exemplary embodiment shown in FIG. 1b, the fitting main body 18 is substantially encompassed by the flange section 22 and the support body 10 is substantially encompassed by the bridge section 28 and the transmission section 24, the distal end of the support body 10 extending out of the transmission element 2 on the transmission section side. However, this design is not compulsory. It is also conceivable that the distal end of the support body 10 and the distal end of the transmission section 24 to come to rest approximately in the same perpendicular plane to the central axis 44, or that the distal end even projects beyond the transmission section 24 of the support body 10. A design which is expedient for the intended application may thus be selected.

Figure 1C:
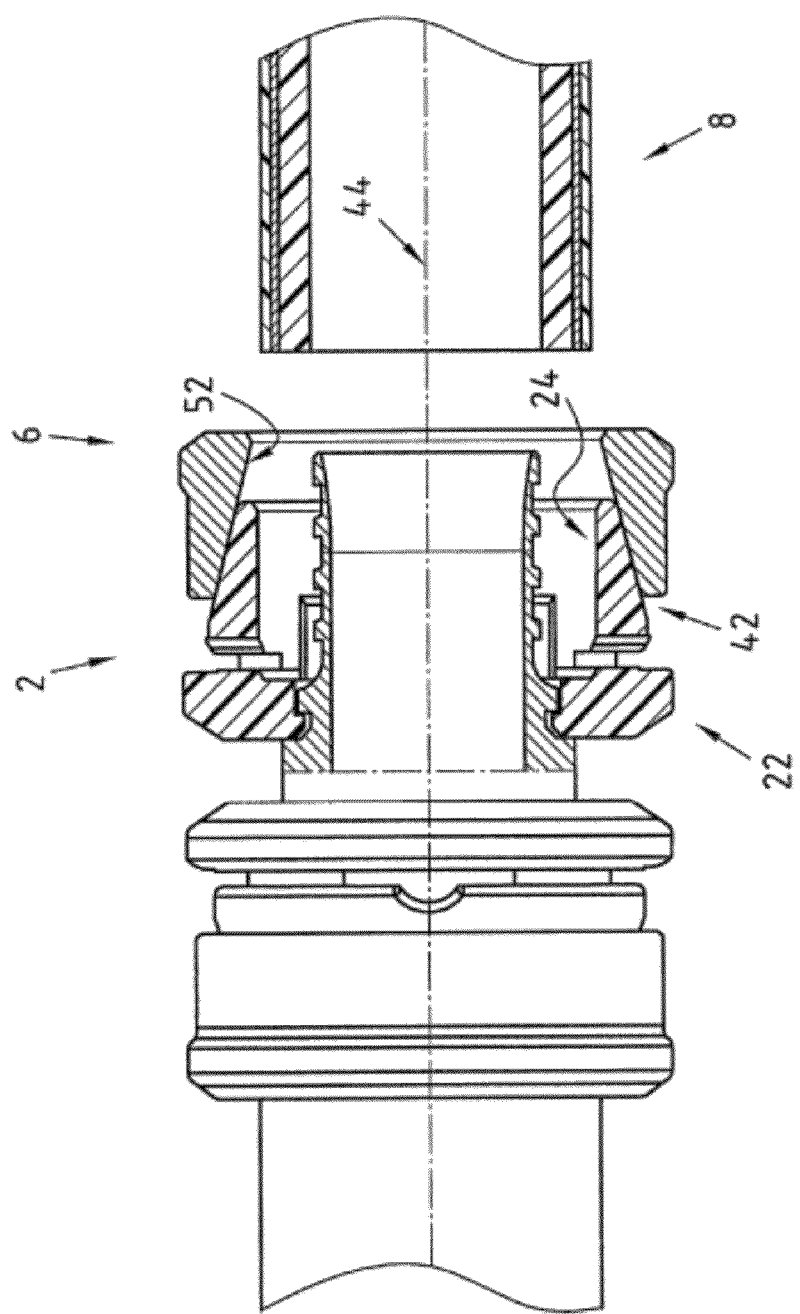

The configuration shown in FIG. 1c differs from that shown in FIG. 1b in that the sliding sleeve 6 is put onto the transmission element 2 on the transmission section side, the internal peripheral surface 52 of the sliding sleeve 6 and the external peripheral surface 42 of the transmission section 24, which are adapted to one another, being at least sectionally in a friction-locked contact. The sliding sleeve 6 is implemented in relation to the transmission section 24 in this special exemplary embodiment in such a way that the internal peripheral surface 52 of the sliding sleeve 6 and the external peripheral surface 42 of the transmission section 24 are not yet completely in contact to cause the friction-locked contact. The length over which the sliding sleeve 6 is to be pressed against the flange section 22 in order to complete the compression procedure and produce the nondetachable connection is substantially determined by the distance between the sliding sleeve end facing toward the flange section 22 and the flange section 22. Other structural designs of the sliding sleeve 6 are also conceivable, however. In particular, the shape or, respectively, the contour of the external peripheral surface of the sliding sleeve 6 are hardly subjected to any restrictions.

FIG. 1c thus shows a configuration according to the invention for producing a nondetachable connection, as a user may obtain commercially, and which is only to be supplemented with a pipe 8 to be pressed in to be able to perform the pressing procedure.

Figure 1D:
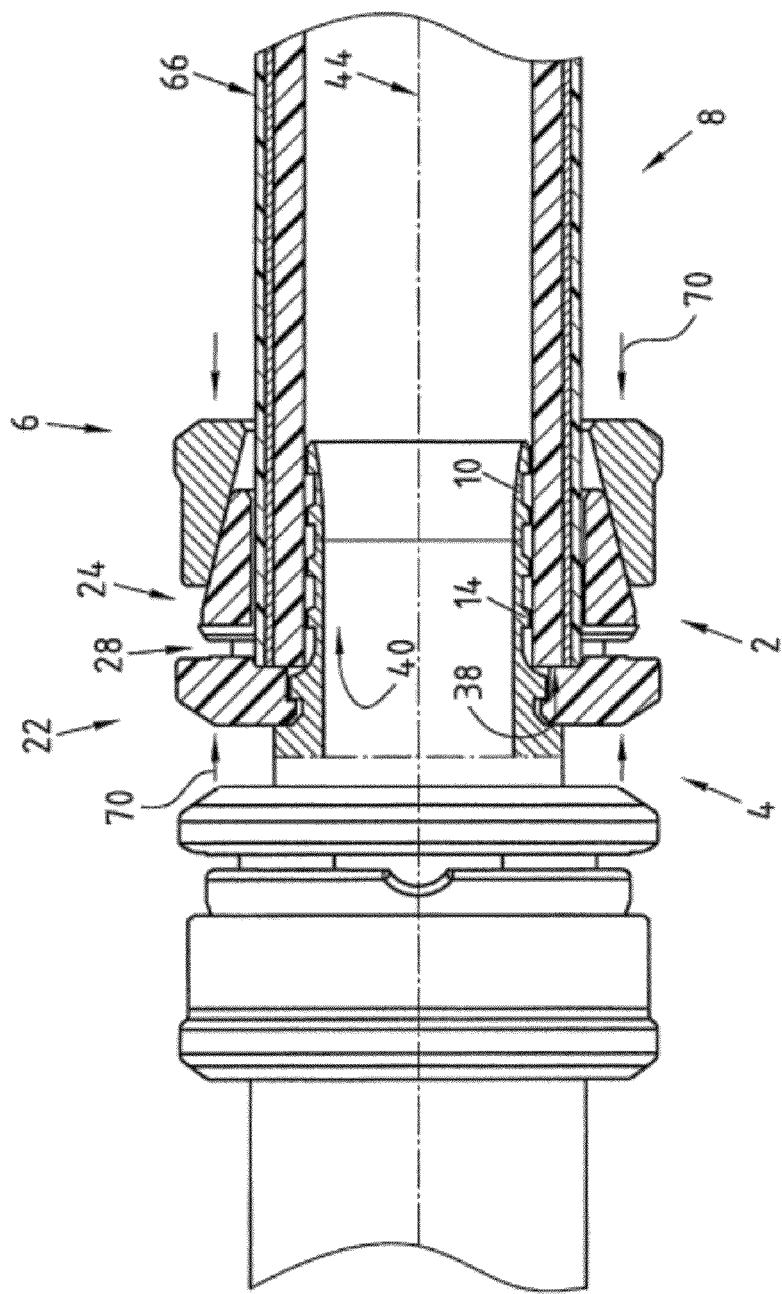
Figure 1G:
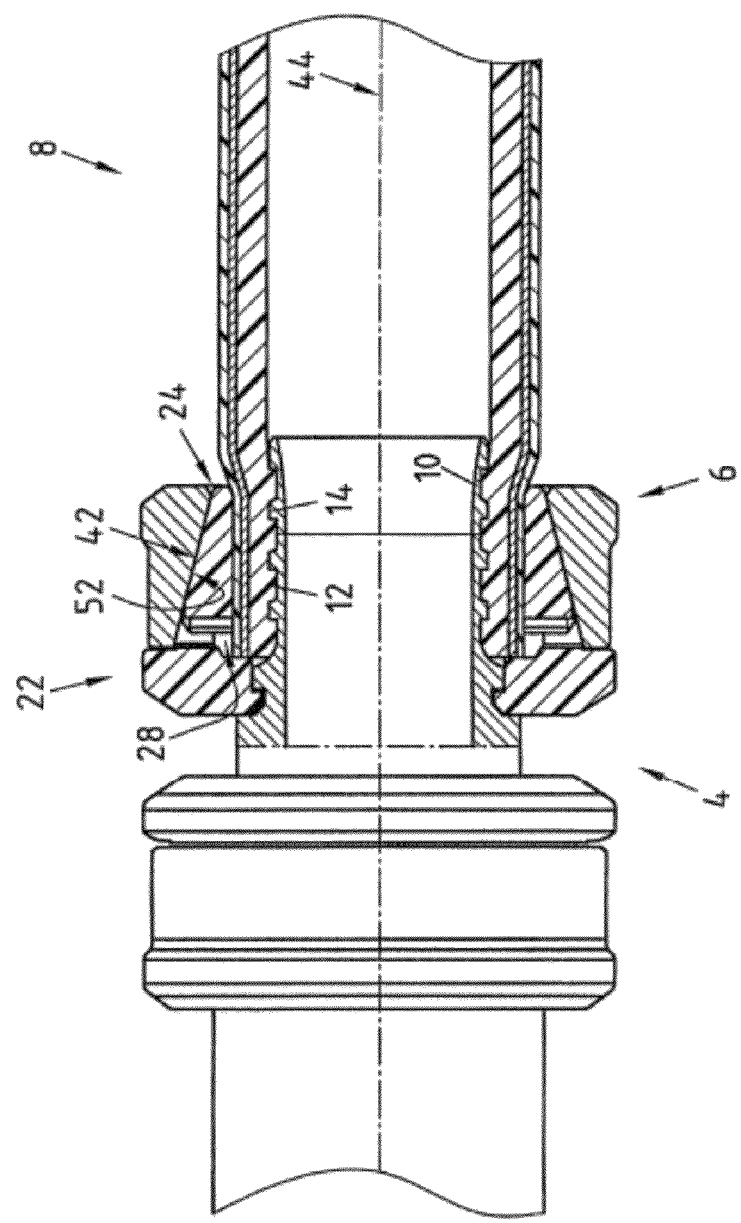

FIG. 1d shows the configuration known from FIGS. 1a-c, in which the pipe 8 has been inserted into the cavity between the support body 10 of the fitting 4 and the transmission section 24 of the transmission element 2. The pipe interior may press against the external peripheral surface of the partition webs 14, in particular friction-locked. The front face 40 of the pipe 8 is pushed onto the contact recess 38 situated on the flange section 22 of the transmission element 2 as far it will go. The external peripheral surface 66 of the pipe 8 is, in this special exemplary embodiment, in friction-locked attachment on the internal peripheral surface of the four axially running webs 50 (not visible) situated on the internal peripheral surface of the transmission section 24, so that the pipe 8 is rotationally-inhibited and lies largely centered in relation to the central axis 44. Due to the partially bulging openings 46 (not visible) on the bridge section 28 and on the transmission section 24, the user may check the proper position of the workpieces 2, 4, 6, 8 to one another in the configuration shown in FIG. 1d.

FIG. 1e shows the configuration known from FIG. 1d, a cross-sectional view along a perpendicular plane placed on the central axis 44 (viewing direction along the arrows 68) further illustrating the configuration of the fitting 4, in particular the support body 10, the transmission element 2, in particular the flange section 22 and the transmission section 24, the sliding sleeve 6, and the pipe 8, in particular the inner layer 60, middle layer 62, and outer layer 64.

To produce the nondetachable connection, pressing forces may be exerted on the arrows 70 shown running parallel to the central axis 44 in FIGS. 1d and 1e.

The result of the pressing procedure is shown in FIG. 1f. The sliding sleeve 6 is moved over the transmission section 24 in the axial direction onto the flange section 22 by the exertion of the pressing forces. A largely uniform pressing force transmission may be ensured via the interaction surfaces 42, 52 situated on the transmission section 24 and on the sliding sleeve 6. Due to the inclination of the internal peripheral surface 52 of the sliding sleeve 6 and the corresponding external peripheral surface 42 of the transmission section 24, the dynamics of the pressing movement exerted in the axial direction in this exemplary embodiment are at least partially changed in direction into pressing forces acting radially inward. The transmission section 24 transmits the pressing forces onto the pipe 8, which is reshaped radially inward in such a way that the grooves 12 on the support body 10 of the fitting 4, which are separated by the partition webs 14, accommodate the displaced material of the pipe 8, and a nonpositive connection and form fit may thus arise. In the final position after the pressing procedure, a front face of the sliding sleeve 6 is in contact with the flange section 22. The bridge section 28 has only been reshaped in the radial direction in this example, its axial extension is substantially equal to the extension before the pressing procedure. The bridge section 28 is overlapped by the thin-walled end of the sliding sleeve 6. However, it is also possible to drive the pressing procedure so far that the bridge section 28 is completely compressed in the axial direction, if this is expedient.

Figure 2C:
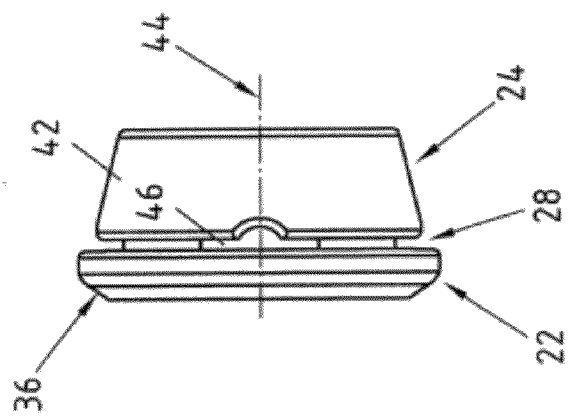
FIGS. 2a-c show an exemplary embodiment of the transmission element according to the invention in three isometric views.
Figure 2B:
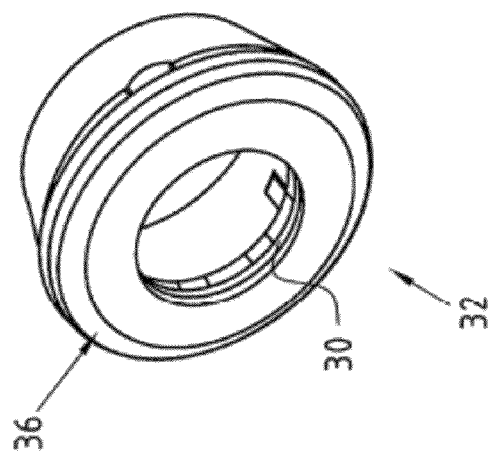
Figure 2A:
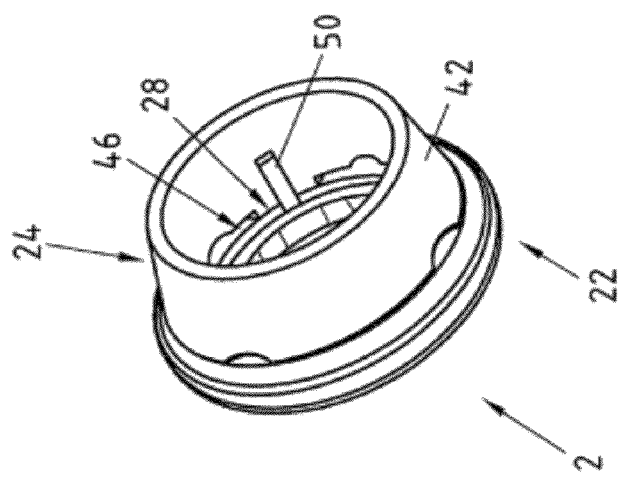

FIGS. 2a-c show the special exemplary embodiment of the transmission element 2 according to the invention shown in FIGS. 1a-f in three isometric views. A recess (not shown), which undercuts the catch projection 30 and is annular in particular, may be provided on the front face 32 of the flange section 22. The pliability of the catch projection 30 is promoted in particular by the undercut.

Figure 3:
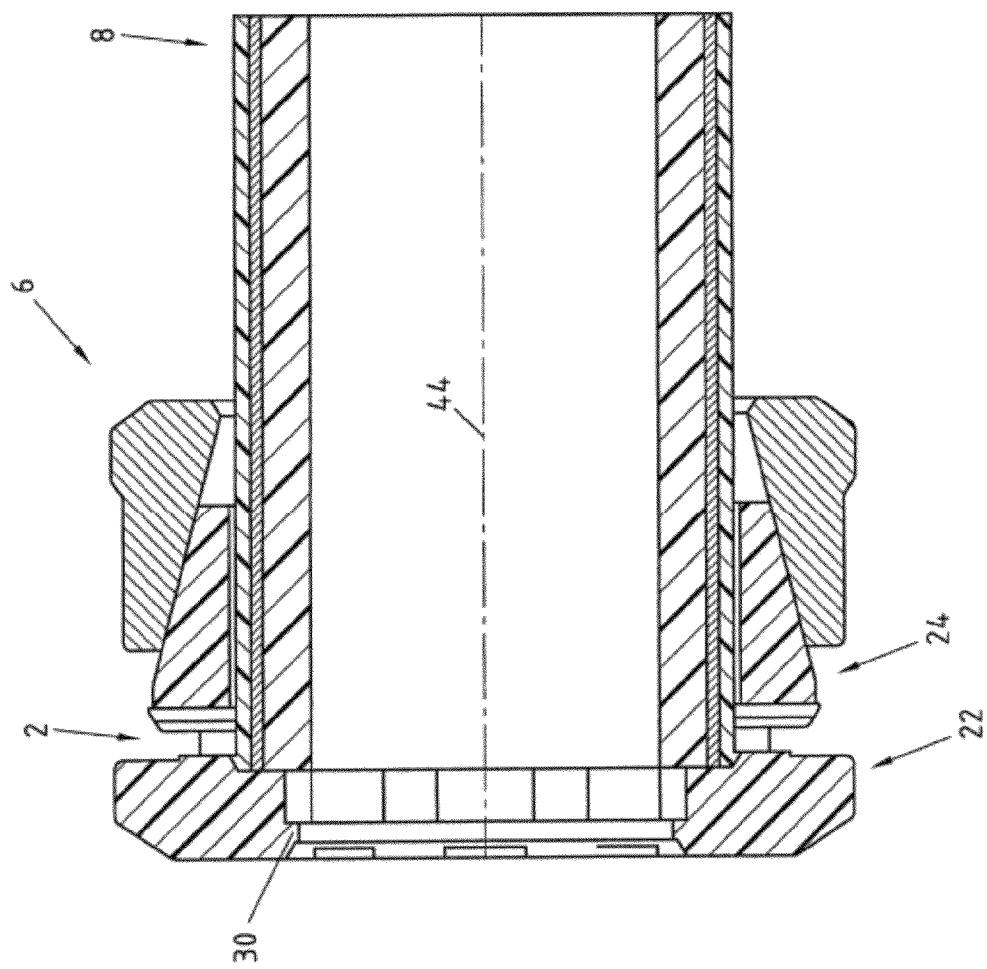
FIG. 3 shows an exemplary variant of the method shown in FIGS. 1a-f.

FIG. 3 shows a configuration which has a transmission element 2, a sliding sleeve 6, and a composite pipe 8. FIG. 3 is to illustrate that it is also possible to first push the transmission element 2 and the sliding sleeve 6, which is in friction-locked attachment therewith, onto the pipe 8, before the configuration of these three workpieces 2, 6, 8 is put onto a fitting 4 as previously described, and the pressing procedure is then performed. The sequence of the various method steps is accordingly not restricted to the example shown in FIGS. 1a-f.

The invention claimed is:
1. A transmission element comprising:
  a flange section comprising:
    an internal peripheral surface, and
    a catch projection situated on the internal peripheral surface of the flange section that engages with a fitting comprising a plurality of annular peripheral grooves and a plurality of annular partition webs and a main body connecting to a support body, wherein the catch projection engages with the main body;
  a transmission section having a substantially cylindrical internal peripheral surface and a wall thickness tapering from an end proximal to the flange section to an end distal to the flange section, wherein a rigid pipe is inserted within the peripheral surface of the transmission section; and
a bridge section connecting the flange section and the transmission section comprising a plurality of webs;
wherein the transmission element is manufactured from a heat-resistant plastic further wherein the rigid pipe encompasses the support body, the transmission element at least partially encompasses the rigid pipe, and a sliding sleeve having a contour of an internal peripheral surface adapted to complement an external peripheral surface of the transmission element is partially pushed onto the transmission section so that the internal peripheral surface of the sliding sleeve and the external peripheral surface of the transmission section are at least partially in friction-locked contact to provide a pipe connection.

2. The transmission element according to claim 1, wherein at least one web running in an axial direction is provided on the internal peripheral surface of the transmission section.

3. The transmission element according to claim 1, wherein the external peripheral surface of the transmission section is implemented in the form of a conical segment.

4. The transmission element according to claim 1, wherein an angle of inclination of the external peripheral surface of the transmission section in relation to a central axis is between 5° and 15°.

5. The transmission element according to claim 1, wherein at least one opening is provided on an end of the transmission section proximal to the flange section or on a bridge section.

6. The transmission element according to claim 1, wherein an external peripheral surface of the flange section has a chamfer on a front face distal to the transmission section.

7. The transmission element according to claim 1, wherein an external peripheral surface of the transmission section or a chamfer of the flange section are implemented to support sliding.

8. The transmission element according to claim 1, wherein the heat-resistant plastic is selected from the group consisting of polysulfones and polyphenylsufones.

9. The transmission element according to claim 1, wherein the heat-resistant plastic comprises fiber-reinforced polyamides.

10. The transmission element according to claim 1, wherein the heat-resistant plastic comprises polyvinylidene fluoride.

11. The transmission element according to claim 1, wherein the flange section has a catch projection extending radially inward.

12. The transmission element according to claim 11, wherein the catch projection is beveled on the side facing toward a front face of the flange section that is distal to the transmission section.

13. A pipe configuration comprising:
a fitting comprising:
a support body comprising a plurality of annular peripheral grooves and a plurality of annular partition webs, and a main body connecting to a support body,
a transmission element manufactured from a heat-resistant plastic comprising:
a flange section comprising:
an internal peripheral surface, and
a catch projection situated on the internal peripheral surface of the flange section that engages with the main body; and
a transmission section having a substantially cylindrical internal peripheral surface and a wall thickness tapering from an end proximal to the flange section to an end distal to the flange section, and
a bridge section connecting the flange section and the transmission section comprising a plurality of webs;
a sliding sleeve having a contour of an internal peripheral surface adapted to complement an external peripheral surface of the transmission section; and
a rigid pipe;
wherein the rigid pipe encompasses the support body, the transmission element at least partially encompasses the rigid pipe, the sliding sleeve is partially pushed onto the transmission section, and the internal peripheral surface of the sliding sleeve and the external peripheral surface of the transmission section are at least partially in friction-locked contact to provide the pipe connection.

14. The configuration for producing a connection according to claim 13, wherein a wall of the sliding sleeve is implemented as substantially wedge-shaped in cross-section.

15. The configuration for producing a connection according to claim 13, wherein the external peripheral surface of the transmission section is implemented in the form of a conical segment and the internal peripheral surface of the sliding sleeve is implemented in a conical segment shape adapted thereto.

16. The configuration for producing a connection according to claim 13, wherein the sliding sleeve has a chamfer, which is implemented to support sliding, on its wide end.

17. The configuration of claim 13, wherein the sliding sleeve encompasses the transmission section and the bridge section.

* * * * *